United States Patent [19]

Kydd

[11] 4,441,943

[45] Apr. 10, 1984

[54] POLYPEPTIDES AS CHEMICAL TAGGING MATERIALS

[75] Inventor: Paul H. Kydd, Lawrenceville, N.J.

[73] Assignee: HRI Inc., Gibbsboro, N.J.

[21] Appl. No.: 417,811

[22] Filed: Sep. 13, 1982

Related U.S. Application Data

[62] Division of Ser. No. 264,991, May 18, 1981, Pat. No. 4,359,353.

[51] Int. Cl.³ .................... D03D 23/00; E02B 15/00
[52] U.S. Cl. .................... 149/109.4; 436/56; 405/60; 252/965
[58] Field of Search ............ 149/2 T, 2, 109.6; 436/56; 252/965; 405/60

[56] References Cited

U.S. PATENT DOCUMENTS

| | | | |
|---|---|---|---|
| 2,689,171 | 9/1954 | Hager et al. | 436/56 |
| 3,494,871 | 2/1970 | Clapp | 252/965 |
| 3,788,948 | 1/1974 | Kagedal et al. | 195/68 |
| 3,861,866 | 1/1975 | Meloy | 252/965 |
| 3,897,284 | 7/1975 | Livesay | 252/965 |
| 3,964,294 | 6/1976 | Shair et al. | 252/965 |
| 4,359,399 | 11/1982 | Boyars | 149/2 |

OTHER PUBLICATIONS

Brown et al., 1979, Liquid Crystals and Biological Structures, Chapter 5, Academic Press, New York, pp. 56-72.

*Primary Examiner*—Stephen J. Lechert, Jr.
*Assistant Examiner*—Howard J. Locker
*Attorney, Agent, or Firm*—V. A. Mallare; Fred A. Wilson

[57] ABSTRACT

The present invention provides a method of tagging a substance to allow subsequent identification thereof comprising incorporating in the substance a polypeptide. Typically, the polypeptide is a synthetic polypeptide having a specific sequence of amino acids to constitute a particular molecular code which can be easily and readily identified.

3 Claims, No Drawings

POLYPEPTIDES AS CHEMICAL TAGGING MATERIALS

This is a division of application Ser. No. 264,991, filed May 18, 1981, now U.S. Pat. No. 4,359,353.

BACKGROUND OF THE INVENTION

1. Field of the Invention

This invention relates to a method of tagging a substance to allow subsequent or retrospective identification thereof. More specifically, this invention relates to the use of polypeptides as tagging materials.

2. Description of the Prior Art

The inclusion of a material in a source substance or composition for subsequent or retrospective identification of such substance or composition is well known in the art. Such a method is usually referred to as "tagging". For example, it is known to include a tagging material in explosives in order to permit the identification thereof after detonation. As another example, it is known to measure the flow of water in a river by injecting a tagging material (e.g. dye) into the river and determine the concentration of the tagging material at a location downstream from the injection point. As a further example, the spreading of an oil spill can be determined by tagging the oil with a suitable material. Thus, tagging materials represent an extremely useful tool in scientific research, environmental protection, law enforcement and other fields.

In general, the tagging material used must be inert and readily indentifiable with accuracy. Known tagging materials include radioactive isotopes, magnetically coded particles and multi-layer paint chips. However, radioactive isotopes must be handled with care and are usually expensive. On the other hand, magnetically coded particles and paint chips cannot be readily identified with accuracy. This is due to the fact that the amount of the tagging material present in the substance in the subsequent identification step may be extremely small, making determination thereof difficult. Thus, there exists a need for a tagging material which causes little or no harm to the environment and can be readily and easily identified at a high accuracy.

SUMMARY OF THE INVENTION

The present invention provides a method whereby a tagging material is incorporated into a substance or composition to allow subsequent or retrospective identification thereof. The method comprises incorporating a polypeptide into the substance or composition as a tagging material and subsequently detecting the presence of such polypeptide. The polypeptide may be synthesized to have a specific sequence of amino acids which can be readily detected and identified even in minute amounts by means of presently available analytical methods and apparatus.

DETAILED DESCRIPTION OF THE INVENTION

According to the present invention, a highly accurate tagging method is provided by using a polypeptide as the tagging material.

Polypeptides are compounds of two or more amino acids which contain one or more peptide groups, —CO.NH—. The amino acids which may be used to form polypeptides include the following:

| Abbreviation | Amino Acid |
| --- | --- |
| Ala | Alanine |
| Arg | Arginine |
| Asn | Asparagine |
| Asp | Aspartic acid |
| Cys | Cysteine (half) |
| Glu | Glutamic acid |
| Gln | Glutamine |
| Gly | Glycine |
| His | Histidine |
| Ile | Isoleucine |
| Leu | Leucine |
| Lys | Lysine |
| Met | Methionine |
| Phe | Phenylalanine |
| Pro | Proline |
| Ser | Serine |
| Thr | Threonine |
| Trp | Trptophan |
| Tyr | Tryosine |
| Val | Valine |

Methods and apparatus for synthesizing and sequencing polypeptides are well known. For examples of synthesizing, see Stewart, et al., "Solid phase Peptide Synthesis," (W. H. Freeman and Co., San Francisco, 1969) and Hunkapiller, et al., Science, 207, 523–525, Feb. (1980); and for an example of sequencing, see Edman, et al., "A protein sequenator," European J. Biochem, 1, 80 (1967).

The basic synthesis involves reacting a protected amino acid with a synthetic resin such as chloromethylated styrenedivinylbenzene copolymer to form an ester bond between the carboxyl groups of the protected acid and the reactive halogenated sites of the resin. The protective group is then selectively removed to generate the free amino group of the resin-supported acid residue, thus making this group available for reaction with the carboxyl group to the next protected amino acid. This next reaction links the protected amino acid and the resin-supported acid residue by an amide bond, and subsequent removal of the protective group from the second acid residue to generate a free amino group again prepares the supported peptide chain for reaction with the next protected amino acid, etc. After the entire polypeptide chain has been developed by stepwise coupling of each amino acid residue as described above, the chain is separated from the resin support and the protective groups on the polypeptide side chains are removed by reaction with cleaving and de-blocking agents, e.g., hydrogen fluoride and sodium in liquid ammonia, thus generating the free polypeptide.

The number and sequence of amino acids used to form the polypeptide utilized in the present invention are not critical. Typically, the polypeptide comprises from about five to about twenty, preferably from about eight to about twelve, amino acids. With at least twenty amino acids presently available, a ten-unit oligomer gives $4 \times 10^{13}$ different molecular codes which practically eliminates the possibility of duplicate codes. In addition, the probability of confusion with naturally occurring polypeptides is also low in view of the large number of molecular codes available in sythesizing polypeptides.

An alternative method for synthesizing the polypeptide, is to use difunctional acids and amines (or alcohols) and add them alternately. Since the difunctional compounds can react with the growing chain once, a polymer can be obtained in which each molecule consists of alternating acid and bases. By using individual acids and bases which are different and identifiable, a molecular code of any desired length and complexity can be used to make the polypeptide.

The polypeptide can be incorporated in the source substance or composition to be treated in any appropriate amount. Subsequent analysis of the source or the surrounding thereof for the presence of the polypeptide will provide information regarding the spread of the source. For example, an amount of the synthesized polypeptide is incorporated in an oil spill on an ocean. Analysis of the water in the vicinity of the spill for the presence of the polypeptide will give an indication on the degree of spreading of the oil spill.

With reference to methods and apparatus for the analysis of polypeptides, these are also well known in the art. As a suitable sequencer, Beckman Model 890C Sequencer manufactured by Beckman Instruments, Inc., Palo Alto, Calif. 94304 can be used. Numerous amino acids or peptide analyzers are available commercially. Beckman Model 119CL, 118CL, 119BL, 118BL and 121MB Amino Acid Analyzers, all manufactured by Beckman Instruments, Inc., Palo Alto, Calif. 94304 and Krontron Liquimat III Amino Acid Analyzer, manufactured by Sequemat Inc., Watertown, Mass. 02172 are typical examples. These analyzers require only minute samples of the amino acids for analysis, usually in the order of micrograms. Hence, it is readily seen that very minute samples of the polypeptide are needed to detect it presence and for its analysis. This constitutes a distinct advantage of the present invention, i.e., the tagging material needs to be present in the retrospective analysis in a very small amount. In addition, the synthesized polypeptide has a specific sequence of amino acids, i.e., a specific molecular code, such a sequence provides a precise characteristic feature of the polypeptide which is readily detectable and distinguishes it from other naturally-occurring and synthetic polypetides.

From the above, it is readily seen that the present invention provides a tagging method which is highly accurate due to the characteristic sequence of amino acids used in forming the polypeptide and which requires the presence of a minute sample of the polypeptide in the subsequent analysis step.

The present invention finds application in numerous instances. For example, the polypeptide can be incorporated into explosives to identify specific manufacturing lots. It can be added to oil shipments to determine the origin of oil spills. It may also be added to stationary pollution sources such as water discharges to determine the distribution of pollutants from the source to the surrounding areas. It can be added to underground aquifers to determine the flow patterns and used as a tag in water injection for oil recovery.

What is claimed is:

1. A method of tagging a substance which is comprised of an explosive composition or an oil to allow subsequent identification thereof comprising incorporating in said substance a synthetic polypeptide having a specific sequence of amino acids.

2. A method of retrospectively identifying the source of a chemical substance which is comprised of an explosive composition or an oil, said method comprising incorporating a synthetic polypeptide having a specific sequence of amino acids in the substance and subsequently analyzing the substance for the presence of said polypeptide.

3. A composition comprising an explosive material and a synthetic polypeptide having a specific sequence of amino acids for retrospective identification of the explosive after detonation.

* * * * *